(12) United States Patent
Mabe, Jr. et al.

(10) Patent No.: US 6,666,774 B2
(45) Date of Patent: Dec. 23, 2003

(54) BILLIARD EQUIPMENT

(75) Inventors: Donald E. Mabe, Jr., Huntington Beach, CA (US); Karl E. Elliott, Atlanta, GA (US)

(73) Assignee: Attitude Technology, Inc., Huntington Beach, CA (US)

( * ) Notice: Subject to any disclaimer, the term of this patent is extended or adjusted under 35 U.S.C. 154(b) by 0 days.

(21) Appl. No.: 09/912,027

(22) Filed: Jul. 24, 2001

(65) Prior Publication Data

US 2002/0142852 A1 Oct. 3, 2002

Related U.S. Application Data

(60) Provisional application No. 60/221,210, filed on Jul. 27, 2000.

(51) Int. Cl.[7] ............................................. A63D 15/06
(52) U.S. Cl. ............................................. 473/32; 473/32
(58) Field of Search .............................. 473/32, 31, 4, 473/1, 6–11, 13, 114, 171, FOR 32, FOR 31, FOR 4, FOR 1

(56) References Cited

U.S. PATENT DOCUMENTS

| | | | |
|---|---|---|---|
| 291,703 A | 1/1884 | Easthope et al. | |
| 861,148 A | 7/1907 | Smith | |
| 3,106,401 A | * 10/1963 | Hyman | 273/108 |
| 3,367,654 A | * 2/1968 | Woods | 473/32 |
| 3,743,288 A | * 7/1973 | Danklefsen | 473/2 |
| 3,861,678 A | * 1/1975 | Fansler | 473/4 |
| 3,897,290 A | 7/1975 | Haller | 156/98 |
| 4,579,342 A | * 4/1986 | Mortensen | 473/3 |
| 4,619,455 A | * 10/1986 | Quraishi | 273/118 R |
| 4,744,010 A | 5/1988 | Witte | |
| 4,906,421 A | 3/1990 | Plamthottam et al. | |
| 5,116,048 A | * 5/1992 | Bilocerkowycz et al. | 273/108.21 |
| 5,267,730 A | 12/1993 | Keaggy | 473/47 |
| 5,346,209 A | * 9/1994 | Kring | 473/32 |
| 5,431,398 A | 7/1995 | Simpkins | 273/129 Q |
| 5,449,544 A | 9/1995 | Ogawa et al. | |
| 5,482,268 A | * 1/1996 | Driska | 473/32 |
| 6,168,533 B1 | 1/2001 | Camara | 473/3 |
| 6,251,024 B1 | 6/2001 | Summers et al. | 473/49 |
| 6,398,675 B1 | * 6/2002 | Eggiman et al. | 473/566 |

* cited by examiner

*Primary Examiner*—Paul T. Sewell
*Assistant Examiner*—Mitra Aryanpour
(74) *Attorney, Agent, or Firm*—Knoble & Yoshida, LLC

(57) ABSTRACT

A cushion for a billiard table is disclosed. The cushion includes an extruded member having a substantially triangular or L-shaped cross-section and a layer of tape on one surface thereof for affixing the cushion to a billiard table. Also disclosed is an improved cue for billiards wherein a substantial portion of the weight of the cue is disposed in a distal portion of the cue located near the tip of the cue, which is used to strike a ball. The cue is preferably modular to allow substitution of various portions of the cue to permit it to be customized to a specific player. Also disclosed is a device for metering the speed of the surface of a billiard table. Also disclosed is a quick-change tip for a cue which includes an elastomeric material that is sized to snugly fit over the distal end of a cue to releasably secure the quick-change tip to the cue.

15 Claims, 7 Drawing Sheets

BILLIARD EQUIPMENT

This application claims the benefit of Provisional Application No. 60/221,210, filed Jul. 27, 2000.

BACKGROUND OF THE INVENTION

1. Field of the Invention

The present invention relates to improvements in billiard equipment. More particularly, the present invention relates to improved billiard cues, tables and associated equipment.

2. Brief Description of the Prior Art

Billiard tables have been made in essentially the same way for many years. The industry standard billiard table cushion is 1.1875 inches across the base and 1 inch in height and has a triangular profile. The standard cushion is molded from pure gum rubber. The basic shaped gum rubber is then vulcanized together with a piece of cloth at the base. The typical billiard table cushion for pool tables is made between 30 and 45 Shore A hardness. A control cloth is then placed over the exterior surface of the cushion.

The process for applying a cushion to a billiard table is to apply rubber cement or carpenter's glue to the base of the cushion and/or the inside wood for the side rails of the billiard table. The cushion is then mounted to the side rails and the glue is left to cure for 24 hours.

Present cushion technology for billiard tables suffers from several disadvantages. First, the gum rubber employed to make the cushions has a limited life span since it undergoes relatively rapid degradation when exposed to temperature changes, air and/or light. Second, the molding process employed to produce gum rubber cushions is susceptible to manufacturing inconsistencies which may result in significant variations in the properties of cushions made by the same manufacturer.

Also, the control cloth of standard cushions tends to wear out quickly, particularly in areas of the table where more frequent play is experienced. Further, the need to use glue to mount current cushions introduces the possibility of error and/or variations due to the use of varying amounts of glue at different locations along the cushion. Also, the 24 hour curing period for mounting cushions is a significant disadvantage of the present technology.

Current billiard cues are frequently made as a single piece from wood although two-piece designs for billiard cues are also employed for more expensive cues. Generally, the area of the cue, which must slide through the guiding hand of the player is made from wood and must be frequently cleaned and treated with friction-reducing materials to prevent sticking.

Another disadvantage of present billiard cues is that they are frequently manufactured at a limited number of lengths and weights due to potentially high manufacturing and inventory costs. It is desirable to provide billiard cues that can be customized in weight, length, grip, tip and shaft, particularly for more experienced players who demand high quality, and consistent equipment to play at a competitive level.

Present billiard cue design calls for the cue to taper from a larger diameter at the butt end to a smaller diameter at the tip used for striking the ball. This design is non-ideal when the physics of pool are considered. Moreover, the taper frequently results in a changing geometric angles during a standard ball stroke since the diameter of the cue passing through the fingers changes as the cue moves back and then forward during a stroke.

Billiard cues also suffer from the disadvantage that the tips are not sufficiently durable to last a long time under normal playing conditions, particularly when the cue is used daily as in many billiard halls. This necessitates frequent replacement of the cue tips thereby resulting in additional costs and, more importantly, at any given time numerous cues may be out of commission due to damaged tips.

Another problem with cue tips is that they require the application of a friction-enhancing material such as chalk to function properly. As a result, billiard centers have to keep an ample supply of chalk on hand for the players. More problematic however, is the mess that this chalk causes when it gets on the floor, billiard table, clothing of the players and even on ceilings and walls when the tip of the cue contacts them. It would be desirable to reduce or eliminate the need for this friction-enhancing material to simplify and clean up the game of billiards.

Finally, a frequent problem faced by all billiard players is that properties of billiard tables vary from table to table. Such things as ball speed, resilience of the cushions, whether the playing surface is level and other factors vary from table to table. At present, there is no method or apparatus for testing a series of the important properties of a billiard table to thereby allow the table to be adjusted and/or graded. As a result, players must spend time to learn the properties of each table that they play on and adjust to the table which results in an unfair advantage for the player most familiar with a particular table.

It is one object of the present invention to provide various embodiments of cushions for billiard tables which overcome one or more of the disadvantages of current cushions for billiard tables.

It is a further object of the present invention to provide various embodiments of billiard cues and/or attachments therefor which overcome one or more of the disadvantages of current billiard cues.

It is a still further object of the present invention to provide an apparatus for use in consistently measuring and testing certain properties of billiard tables which affect the play of the game to thereby overcome one or more of the disadvantages of present testing apparatus and to provide the ability to correct the tables and/or rate the tables.

Various embodiments of the present invention are directed to solving one or more of the foregoing problems.

SUMMARY OF THE INVENTION

In a first aspect, the present invention relates to an advanced billiard table cushion, which can be used on standard billiard tables.

In a second aspect, the present invention relates to an advanced cue stick for use in billiards.

In a third aspect, the present invention relates to various attachments for an advanced cue stick for use in billiards.

In a fourth aspect, the present invention relates to a device for use in consistently measuring and testing certain properties of billiard tables which affect the play of the game to thereby overcome one or more of the disadvantages of present testing apparatus and thereby provides the ability to correct the tables, and/or rate the tables.

Additional features and advantages of the invention will be set forth in part in the description that follows and other features and advantages will be apparent from the detailed description or may be learned by practice of the invention.

It is to be understood that the foregoing general description of the invention and the following detailed description are exemplary and explanatory only and are not to be restrictive of the invention as claimed.

DETAILED DESCRIPTION OF THE PREFERRED EMBODIMENTS

Figure 1A:
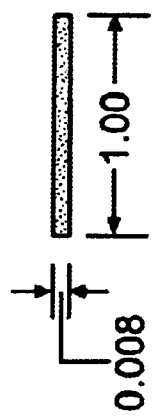
FIGS. 1A and 1B show two different cross-sectional views of a cushion in accordance with the present invention.

Reference will now be made in detail to exemplary embodiments of the invention. One skilled in the art, given the description of the invention herein will recognize the utility of the apparatus and method of the present invention in a variety of diverse table games including at least pool, snooker, billiards, bumper pool and other similar table games. However, for ease of description, the present invention will be described in the context of the game of pool.

In a first aspect, the present invention relates to a cushion, which is suitable for use on a billiards table such as a pool table or other similar table. The cushion of the present invention is made by extrusion in an integrated process. The extrusion process permits manufacture of the cushion to extremely small tolerances. The extrusion process is also advantageous for curing since it can be carried out at steady speeds and consistent temperatures. This represents a significant advantage over molding and vulcanization processes since these processes cannot apply a constant curing temperature. Moreover, the heating elements used for curing and the conduction and/or radiation rates of the mold, as well as the differential thermal coefficients of the rubber and cloth, all result in variations in the cure rate and thus in the properties of conventional cushions for billiard tables.

The integrated extrusion process for making the cushion of the present invention includes applying a hot bond tape. The hot bond tape may be affixed to the base of the material while it is being extruded. The tape is double-sided to allow table manufacturers to quickly and accurately apply the cushion to the table using the tape to adhere the cushion in place. This application process eliminates nearly 24 hours of cure time from the standard billiard table manufacturing process.

In addition, the nature of the material used for the cushion of the present invention and the extrusion process used to make it, permit the cushion to be tailored to virtually any shore hardness, which may be required by table manufacturers. The cushion of the present invention is preferably made from one of several high-tech engineered polymeric materials, which can be engineered to the shore hardness and elasticity required for billiard tables. Cushions made from such engineered polymeric materials have a consistency superior to that of gum rubber and they last longer. Also, due to the engineered properties of the polymeric materials, cushions made from them do not require a control cloth, which is a major source of wear and breakdown in conventional cushions. One exemplary suitable polymeric material is Monprene® #1037FL. Monprene® has the advantages that it is easily extrudable, has the right properties for cushions, will significantly outlast cushions made from natural rubber, is resistant to low temperatures and ultraviolet degradation and does not require vulcanization in the manufacturing process. Other similar materials may also be employed and such similar materials are known to those skilled in the art. A suitable exemplary hot bond tape is 3M® #4981 hot bond tape. Other similar hot bond tapes may also be employed and such similar materials are known to those skilled in the art. Cold bond tapes may also be employed. The tape is preferably co-extruded with the Monprene® to form it as an integral part of the cushion. The cushion material should have a Shore hardness of 25–45 on the A scale instantaneous and should rate 60–90 on the resilience test per ASTM standard D 2632–96.

Figure 7:
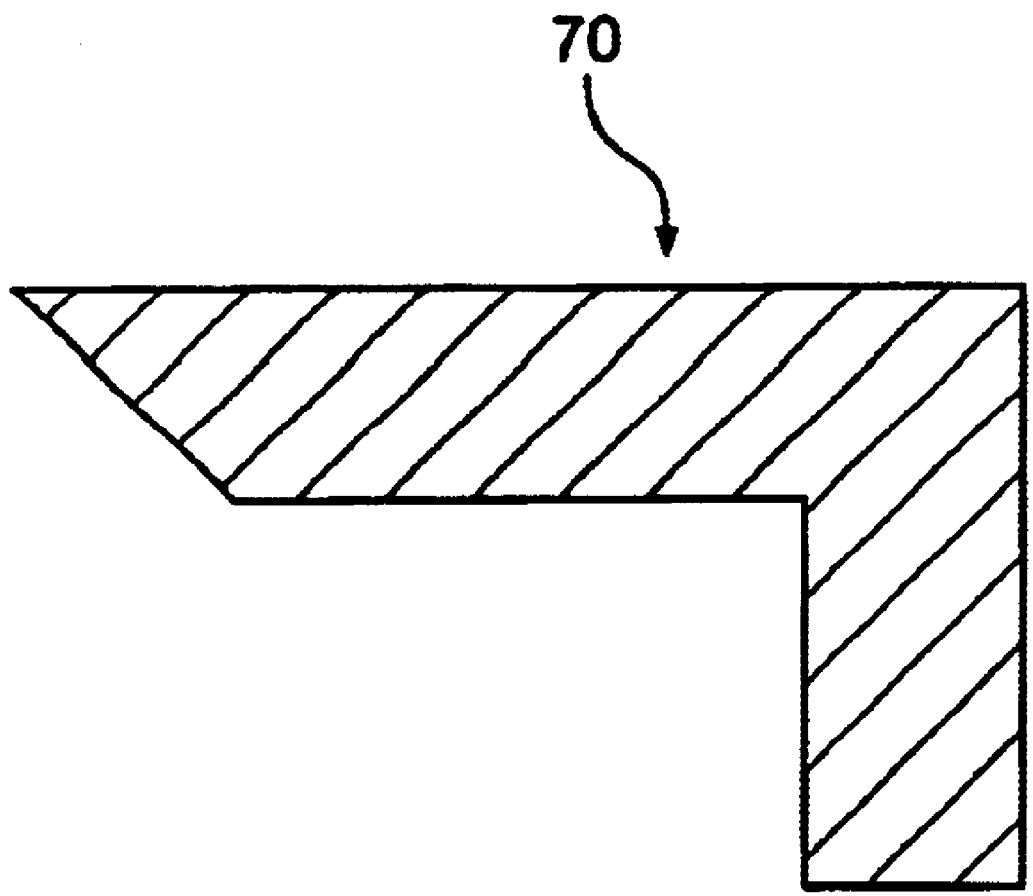
FIG. 7 is a cross-sectional view of an L-shaped cushion in accordance with the present invention.

Referring to FIG. 7, there is shown a cross-sectional view of an L-shaped cushion 70 accordance with the present invention.

Figure 1B:
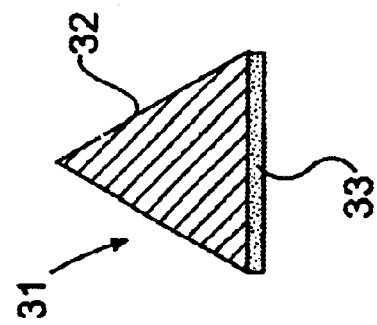
Figure 1:
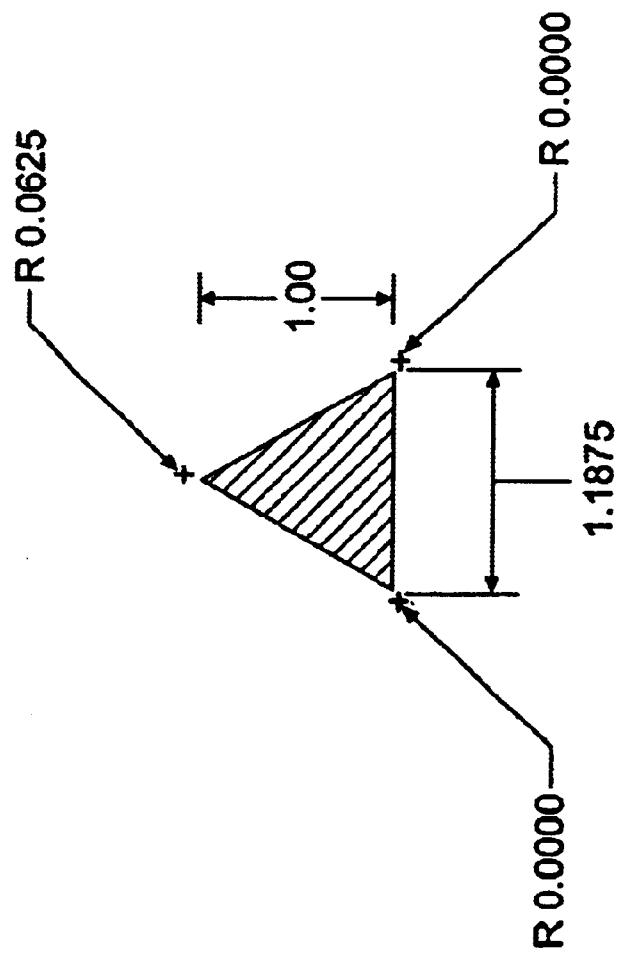
FIG. 1 shows a cross-sectional view of a cushion in accordance with the present invention indicating the dimensions of the cushion.

FIG. 1 shows a cross-sectional view of a cushion in accordance with the present invention indicating the dimensions of the cushion. Referring to FIGS. 1A–1B, there is shown a cross-sectional view of a K-66 cushion made by an integrated extrusion process in accordance with the present invention from Monprene® #1037FL and 3M® #4981 hot bond tape. "K-66" is a standard designation of a particular type of cushion used for a particular type of billiard table. The dimensions of a standard K-66 cushion are depicted in FIG. 1A. FIG. 1B shows a K-66 cushion structure 31 including a triangular section 32 and tape 33 that is employed to affix triangular section 32 to a billiard table instead of using, for example, the highly complex conventional method of affixing cushions to a billiard table that is depicted in FIG. 2.

Figure 2:
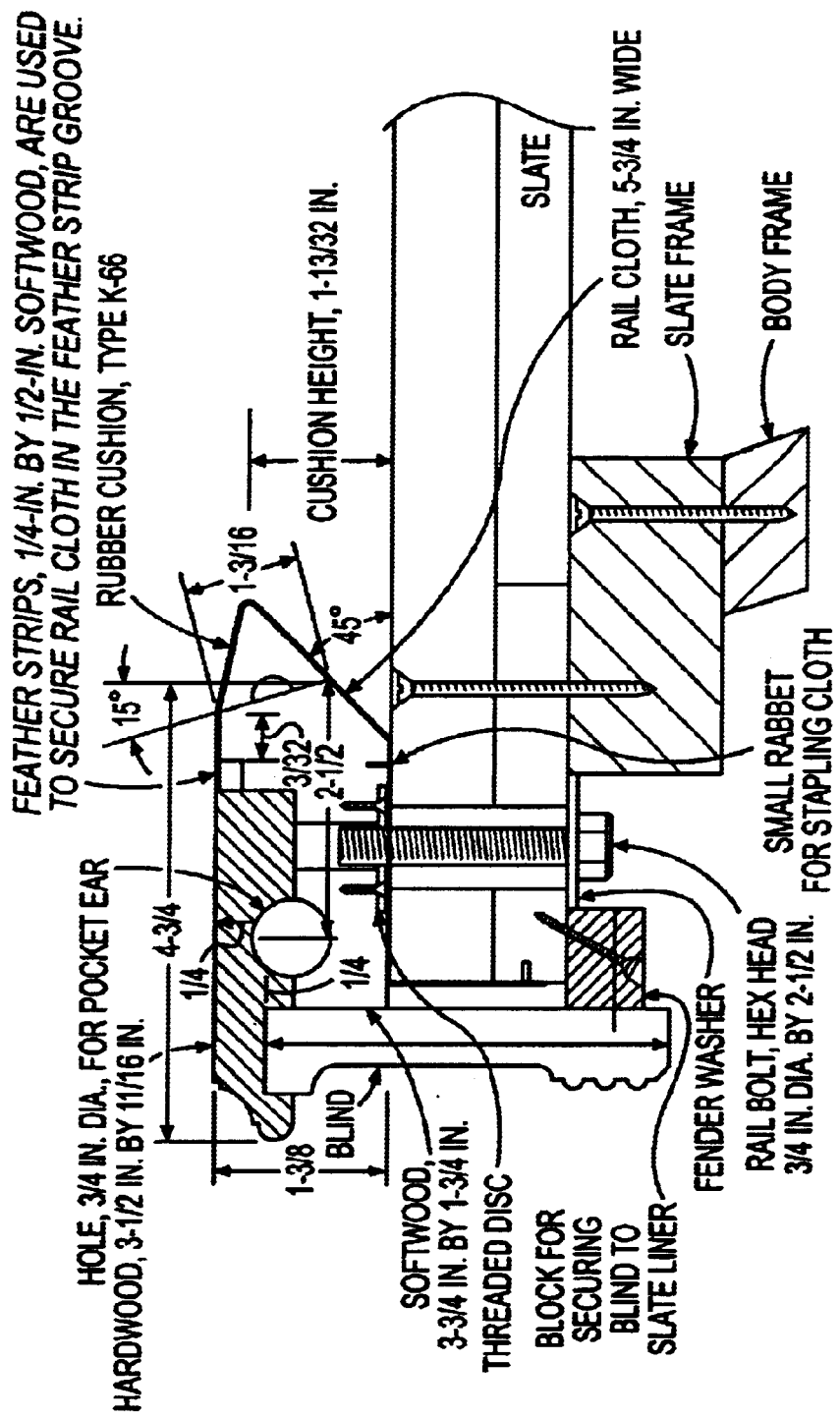
FIG. 2 is a cross-sectional view showing how, in the prior art, a conventional cushion is mounted on a billiard table.

Referring to FIG. 2, there is shown a cross-sectional view of prior art rails and blinds. This view shows how to attach a conventional prior art cushion to a standard pool table to ensure that the control cloth is taut, properly positioned and maintained in place. Using the present invention, this can be greatly simplified since the control cloth can be eliminated and the hot bond tape can be employed to affix the cushion directly to the wood portion of the billiard table.

In a second aspect, the present invention relates to an inertia based geometrically correct cue stick. The cue may be used for playing any table billiards game, which requires the use of a cue and can be made in a variety of sizes and weights to suit different players and different games. The cue of the present invention may include one or more of several features, which may render it distinctive.

First, the cue may have a substantially uniform diameter from one end of the cue to the other, rather than being tapered, as is the case with most conventional cues. By substantially uniform is meant that over most of the length of the cue the diameter of the cue remains substantially the same allowing for up to a 10% variation in diameter. More preferably, the cue has only up to a 5% variation in diameter and most preferably the variation in diameter is less than about 2%. The substantially uniform diameter facilitates the maintenance of a substantially constant geometric angle throughout the stroke of the ball.

Second, the cue of the present invention may include a front loaded weight system whereby a substantial portion of the weight of the cue is located in the half of the cue nearest the tip used to strike the ball. More preferably, substantially more than half the weight of the cue is located in the half of the cue nearest the tip used to strike the ball. Most preferably, about 60–80% of the weight of the cue is located in the front half of the cue nearest the tip used to strike the ball. This front loaded weight system is the key to supplying inertia to the cue, thereby delivering a more consistent stroke of the ball.

The front-loading of the weight places the weight where it is most correctly utilized thereby resulting in a shorter stroke that accurately applies the mass of the cue to the intended target. There is no longer a need to transfer the weight of the stick from the back to strike the ball.

Thirdly, the cue of the present invention may include modular sections which may be separated and replaced to vary the total weight, weight distribution, feel and/or finish of the cue, as desired. Preferably, the modular sections are provided with quick connecting means, which allow rapid disassembly and reassembly of the cue for play. Modular cues may also include weights as a component of the cue. A variety of different variations of the modular sections of the cue made from different materials such as polymeric tubing, aluminum tubing, and stainless steel rod are described in the following two pages of tables which discuss both one piece and three piece cues or sticks.

| THREE PIECE STICK | 0.375 | | | |
| --- | --- | --- | --- | --- |
|  | Section 1 | Section 2 | Section 3 | Totals |
| PLASTIC TUBING | 21.67 | 21.67 | 21.67 | 65.00 |
|  | 3.345 | 1.921 | 1.921 | 7.187 |
|  |  | 1.387 | 1.387 | 2.773 |
|  | 10.862 |  |  | 10.862 |
| Total Weight in Ounces | 14.207 | 3.308 | 3.308 | 20.823 |
| Total Percentages | 68.23% | 15.89% | 15.89% | 100.00% |
| PLASTIC TUBING .625 OD | OZ per IN |  |  |  |
| 0.125 inside diameter | 0.235 |  |  |  |
| 0.1875 inside diameter | 0.226 |  |  |  |
| 0.25 inside diameter | 0.212 |  |  |  |
| 0.375 inside diameter | 0.154 |  |  |  |
| 0.5 inside diameter | 0.089 |  |  |  |
| 0.035 | 0.028 |  |  |  |
| 0.049 | 0.036 |  |  |  |
| 0.058 | 0.041 |  |  |  |
| 0.035 | 0.036 |  |  |  |
| 0.049 | 0.048 |  |  |  |
| 0.058 | 0.054 |  |  |  |
| 0.035 | 0.044 |  |  |  |
| 0.049 | 0.059 |  |  |  |
| 0.058 | 0.068 |  |  |  |
| 0.065 | 0.075 |  |  |  |
| 0.035 | 0.052 |  |  |  |
| 0.028 | 0.048 | 0.768 | 0.064 |  |
| 0.035 | 0.06 | 0.960 | 0.080 |  |
| 0.049 | 0.082 | 1.312 | 0.109 |  |
| 0.058 | 0.095 | 1.520 | 0.127 |  |
| 0.065 | 0.105 | 1.680 | 0.140 |  |
| 0.083 | 0.128 | 2.048 | 0.171 |  |
| 0.120 | 0.168 | 2.688 | 0.224 |  |

| Outside diameter | PD. per FT. | OZ. per FT. | OZ. Per IN |
| --- | --- | --- | --- |
| 0.125 | 0.042 | 0.672 | 0.056 |

| THREE PIECE STICK | 0.25 | | | |
| --- | --- | --- | --- | --- |
|  | Section 1 | Section 2 | Section 3 | Totals |
| PLASTIC TUBING | 21.67 | 21.67 | 21.67 | 65.00 |
|  | 4.586 | 1.921 | 1.921 | 8.428 |
|  |  | 1.387 | 1.387 | 2.773 |
|  | 4.824 |  |  | 4.824 |
| Total Weight in Ounces | 9.410 | 3.308 | 3.308 | 16.025 |
| Total Percentages | 58.72% | 20.64% | 20.64% | 100.00% |
| .375 ID | 65 | ONE |  |  |
| PLASTIC TUBING | 10.036 | PIECE |  |  |
|  | 7.520 | STICK |  |  |
| Total Weight in Ounces | 17.556 |  |  |  |
| Total Percentages |  |  |  |  |
| .250 ID | 65 | ONE |  |  |
| PLASTIC TUBING | 13.757 | PIECE |  |  |
|  | 4.676 | STICK |  |  |
| Total Weight in Ounces | 18.433 |  |  |  |

| -continued | | |
|---|---|---|
| Total Percentages | | |
| .500 ID | 65 | ONE |
| PLASTIC TUBING | 5.763 | PIECE |
| | 2.773 | STICK |
| | 10.000 | |
| Total Weight in Ounces | 18.537 | |
| Total Percentages | | |

Another feature which may be included in the cue of the present invention are quick change tips which would permit use of different tip diameters, hardness and/or coefficients of friction to meet the desires of the player or to adapt for changing playing conditions, different games or different billiard tables. Quick-change tips can be snap on, screw or can be attached in any other suitable manner.

One particularly preferred embodiment of quick change tips is in the form of replaceable tips having an elastic or stretchable rubber material attached thereto in a shape like a condom to fit over the end of the pool cue with the elastic or stretchable rubber holding the tip firmly in place on the end of the cue. Such quick-change tips can be made in custom designs to provide distinctiveness to the cue, such as use of a glow in the dark elastic material.

Another feature that may be included in the cue of the present invention are neoprene tips that do not require the use of chalk. The neoprene can be fabricated with sufficient hardness to maintain its shape and with a suitable coefficient of friction to prevent miscuing, give greater bite and allow the ball to be struck centrally and geometrically correct every time. Another alternative is a liquid steel tip, which has good hardness and friction properties and should last forever. The liquid steel tip may require a slight dampening of the tip for use but no chalk would be required.

Yet another feature that may be included in the cue of the present invention are changeable tail grips on the butt end of the cue. Changeable tail grips can be employed to provide cues having different diameters, feels and textures as desired by the player. In one embodiment, the changeable tail grips can form part of a modular butt end of the stick such that changing the butt end changes the tail grip. In another embodiment, the changeable tail grips can be fabricated from a tubular elastic material which can be stretched and slipped over the butt end of the cue and will adhere tightly to the cue at the desired location when the elastic material returns to its original form.

Finally, the cue of the present invention may be constructed from any suitable polymeric material. Use of such polymeric materials low cost, high durability cues. Also, polymeric materials can be employed to provide variable weights, lengths and diameters, as well as a variety of different surface finishes including finishes with a very low coefficient of friction to reduce sticking of the cue in the hand. These features allow a player to customize the cue to exacting specifications. Finally, polymeric materials can be fabricated to very tight tolerances allowing for precision manufacture of cues. Particular suitable polymeric materials are polymer composites since they are durable, light weight and easy to manufacture.

Any one or more of these various features may be combined with one another to produce a cue in accordance with the present invention.

Figure 3:
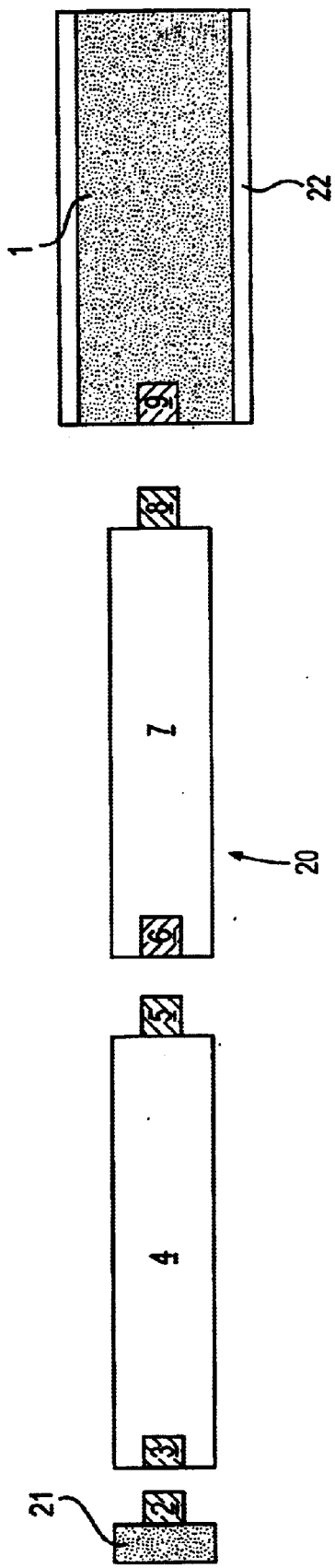
FIG. 3. is a cross-sectional view of an inertia based geometrically correct billiard cue in accordance with the present invention.

Referring now to FIG. 3, there is shown one embodiment of a modular inertia based geometrically correct cue 20 in accordance with the present invention. The cue 20 includes a tip 21, preferably fabricated from neoprene or other suitable materials. The neoprene tips may be fabricated in different hardnesses so that players can change the tip 21 to meet their particular playing needs. The tip 21 is preferably made to conform to regulation playing dimensions. The tip 21 preferably includes a male connector 2 that is preferably integrally formed with tip 21. The male connector 2 should permit a simple, yet tight releasable connection between tip 21 and the shaft section 4 of cue 20. Any suitable, conventional male connector 2 can be employed.

Shaft section 4 includes a female connector 3, which matingly engages with male connector 2 of tip 21 to releasably secure the tip 21 to shaft section 4. If a releasable tip 21 is not required, then tip 21 can be permanently affixed to shaft section 4 by any suitable means such as fusing male connector 2 to female connector 3. Shaft section 4 preferably has about 50–80% of the weight of combined shaft sections 4, 7 and handle section 1, more preferably about 60–75% of the weight of combined shaft sections 4, 7 and handle section 1 and most preferably about 65–70% of the weight of combined shaft sections 4, 7 and handle section 1.

Shaft section 4 includes a connector shown as a male connector 5 in FIG. 3. This connector 5 is preferably integrally formed with shaft section 4. Alternatively, the connector 5 of shaft section 4 could be a female connector in which case the connector 6 of shaft section 7 would then be a male connector. Again, any suitable, conventional connectors 5, 6 can be employed to connect shaft sections 4 and 7. Most preferably, connectors 5, 6 provide a releasable connection between shaft sections 4 and 7, although it is also possible to have a permanent connection between shaft sections 4, 7 or to form shaft sections 4, 7 integrally as a single shaft section.

Shaft sections 4, 7 may be made of any suitable material. Preferably, shaft section 4 is made from a dense polymeric material and has a homogeneous weight distribution. Shaft section 7 is preferably made from a material that is less dense than shaft section 4 to permit the shaft section 7 to have a diameter similar to the diameter of shaft section 4 while having a significantly lower weight than shaft section 4.

Shaft section 7 preferably has a weight of about 80–120% of the weight of handle section 1. More preferably, shaft section 7 has a weight of about 90–110% of the weight of handle section 1. Most preferably, handle section 1 and 7 have about the same weight.

Shaft section 7 includes a connector shown as a male connector 8 in FIG. 3. This connector 8 is preferably integrally formed with shaft section 7. Alternatively, the connector 8 of shaft section 7 could be a female connector in which case the connector 9 of handle section 1 would then be a male connector. Again, any suitable, conventional connectors 8, 9 can be employed to connect shaft section 7 and handle section 1. Most preferably, connectors 8, 9 provide a releasable connection between shaft section 7 and handle section 1, although it is also possible to have a permanent connection between shaft section 7 and handle section 1 or to form shaft section 7 integrally with handle section 1 as a single section. Finally, shaft sections 4, 7 and handle section 1 may all be permanently affixed to one another or formed integrally as a one-piece device, if desired.

Handle section 1 preferably includes a grip 22 on the outer surface thereof. Handle section 1 may have a surface finish to facilitate exchanging grips 22 to allow customizability of the grip of cue 20. The grip 22 is preferably slid over the outside of handle section 1 and may be made of any suitable material such as foam, rubber, etc. Conventional grips and/or grip materials may be employed in the cue 20 of the present invention. The weight of the grip 22 should be considered as part of the overall weight of handle section 1. More preferably, handle section 1 has a slightly larger diameter than shaft section 7 to provide a suitable diameter for a comfortable grip on the cue by the user.

Preferably, the shaft sections 4, 7 and handle section 1 all have about the same length. However, it is possible to vary the lengths of each of these sections by up to about 25% relative to one another within the scope of the present invention.

In a specific embodiment of the invention, the cue is five feet five inches long and weighs 19 ounces. Each section of the cue is 1.8333 inches long. Shaft section 4, including tip 21, weighs 12.666 ounces. Shaft section 7 and handle section 1 each weight 3.166 ounces. Cue weights can be varied to accommodate different players. Conventional cue weights typically vary from about 17 ounces to about 22 ounces.

Figure 4:
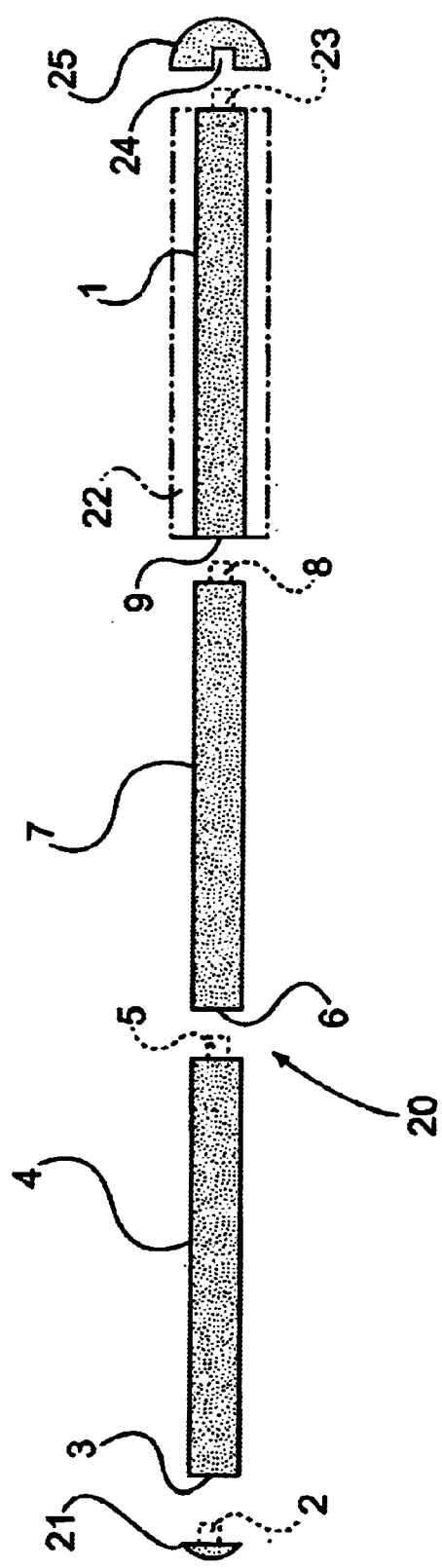
FIG. 4 is a plan view showing the overall design of a billiard cue in accordance with the present invention.

FIG. 4 shows a plan view of the design of a modular cue in accordance with the present invention employing a quick change tip that snaps into place, quick connect fittings to connect the various elements of the cue together and a snap in end bumper to protect the butt end of the cue. More specifically, the cue 20 of FIG. 4 includes a tip 21 provided with a male connector 2. A shaft section 4 is provided with a female connector 3 to connect with male connector 2 of tip 21 and a male connector 5 to connect with female connector 6 of shaft section 7. Shaft section 7 farther includes a male connector 8 to connect with female connector 9 of handle section 1. Handle section 1 is provided with a grip 22 and a male connector 23 to connect with female connector 24 of end bumper 25.

Figure 5C:
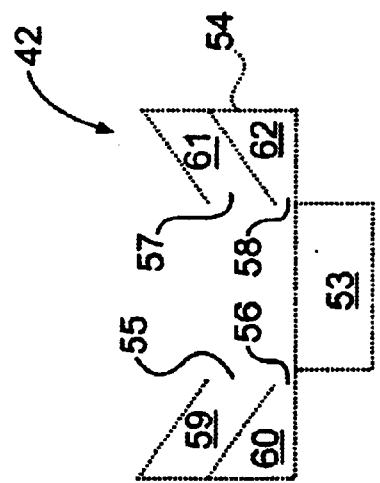
FIGS. 5A–5C are sectionals view of the quick-connect fittings that may be employed in the billiard cue of the present invention.
Figure 5B:
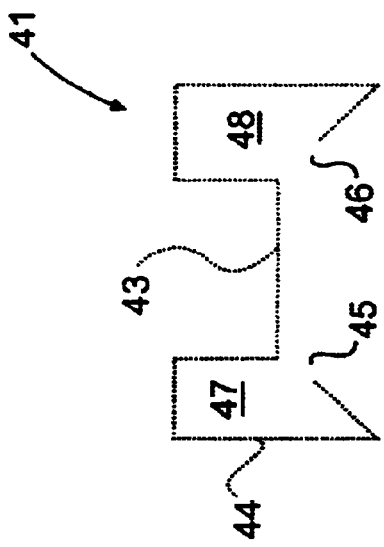
Figure 5A:
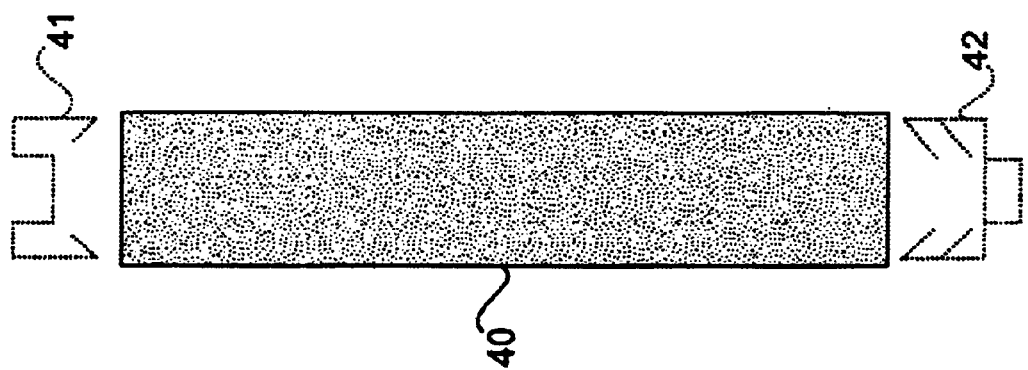

FIGS. 5A–5C show the details of the quick-connect fittings for use in the modular cue of the present invention. FIG. 5A shows a schematic view of a shaft section 40 having a female quick-connect fitting 41 at one end and a male quick-connect fitting 42 at the other end. Quick-connect fittings 41, 42 are designed to fit within the distal and proximal ends of shaft section 40 for ease of manufacture and thus have a cylindrical cross-section with a slightly smaller diameter than the cylindrical cross-section of the shaft section 40.

To assemble shaft section 40 with fittings 41, 42, a fitting 41, 42 is placed in a jig with the connecting end down. The shaft section 40 is lowered into place and cold pour is deposited into shaft section 40. The fitting 41, 42 is placed in the shaft section 40 and the cold pour hardens to seal the fitting 41, 42 into shaft section 40.

FIG. 5B shows the detail of a suitable female fitting 41. Female fitting 41 includes a female connector 43 formed as a slot in one end of female fitting. 41. Female fitting 41 also preferably includes an outer surface 44 which is of sufficient size and diameter to fit within shaft section 40 for easy assembly as described above. Also, female fitting 41 may include an openings 45, 46 leading to hollow sections 47, 48 so that, for example, cold pour can pass through openings 45, 46 and at least partially fill hollow sections 47, 48 to more securely hold female fitting 41 in shaft section 40.

FIG. 5c shows the detail of a suitable male fitting 42. Male fitting 42 includes a male connector 53 formed as a protrusion from one end of male fitting 42. Male fitting 42 also preferably includes an outer surface 54 which is of sufficient size and diameter to fit within shaft section 40 for easy assembly as described above. Also, male fitting 42 may include an openings 55, 56, 57, 58 leading to hollow sections 59, 60, 61, 62 so that, for example, cold pour can pass through openings 55, 56, 57, 58 and at least partially fill hollow sections 59, 60, 61, 62 to more securely hold male fitting 42 in shaft section 40.

In another aspect, the present invention relates to an apparatus for checking or to rate the quality of a billiard table. One embodiment of such an apparatus is shown in a vertical plane cross-section in FIG. 6A and a horizontal plane cross section in FIG. 6B. This device will be called a stint meter for the purpose of this description.

In its simplest form, the stint meter includes a vertical tube 10, which extends down and connects to a curved tube 11 located in a base 12. The stint meter is placed on a billiard table with the base 12 sitting on the table and the back side 13 of the base 12 up against one of the cushions. A ball is dropped down vertical tube 10 through top opening 14 and passes through curved tube 11 in base 12 and rolls out onto the billiard table. Since the ball can be dropped from a constant height at opening 14, the distance that the ball rolls can be used to measure the speed of the table and/or the bounce of the cushions.

Figure 6A:
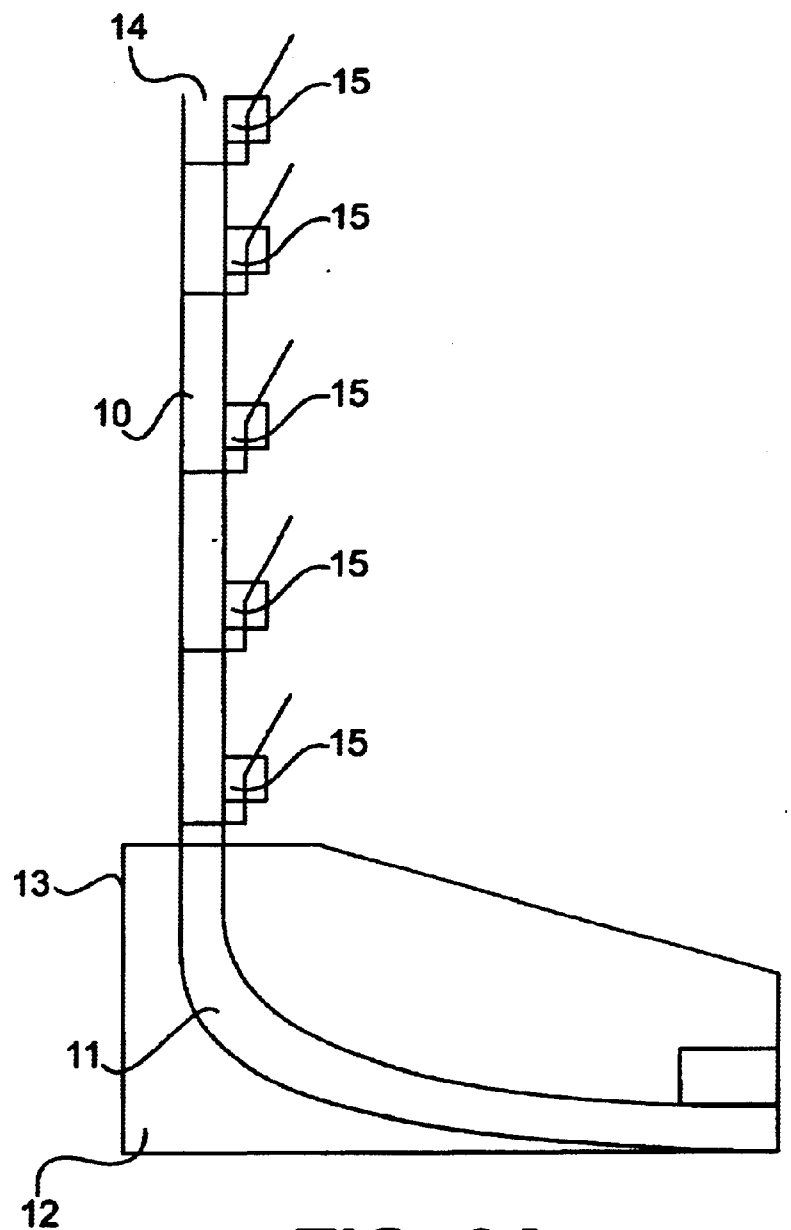
FIG. 6A is a vertical plane cross-sectional view of a stint meter in accordance with the present invention.
Figure 6B:
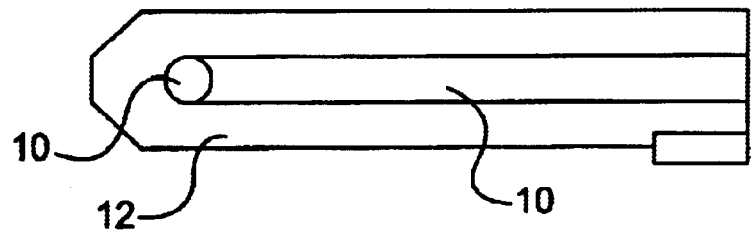
FIG. 6B is a horizontal plane cross-sectional view of a stint meter in accordance with the present invention.

A more sophisticated stint meter is shown in FIGS. 6A–6B since it has a plurality of openings 15 located at different heights along vertical tube 10 through which a ball can be inserted into vertical tube 10 at a variety of different heights. In this manner, the stint meter of FIGS. 6A–6B can be used to perform a variety of different methods of testing a billiard table to provide an overall quality rating for that table.

An even more sophisticated stint meter may include a variety of different shapes built into the base or different attachments for the base for placing the stint meter at various predefined locations on a billiard table such as in a corner or at an angle to the cushion so that even more varied test methods can be carried out.

The present invention also includes a method for testing or rating billiard tables using the stint meter of the invention or a similar type of device. In the method, a standardized set test steps consisting of, for example, drop points, drop heights and/or ball roll angles are predefined and a ball is dropped and rolled using the stint meter at each step to thereby provide a thorough test of the quality of a billiard table.

More specifically, one test can be employed to determine the roll speed of the table. One or more tests can be employed to determine whether the surface of the table is level. More sophisticated tests can be employed to determine the degree of bounce in the cushions as well as whether each of the cushions provides the proper angle of return of the ball off of the cushion at various locations along the cushion and at various impact angles. The method can be designed as a series of different tests, which provide a rating of the quality of the table by measuring one or more of all the relevant playing features of a billiard table.

The table rating method may also be employed to provide published ratings of various billiard establishments or specific tables within such establishments to encourage billiard establishments to impose high standards of maintenance and repair for their billiard tables thereby resulting in an overall improvement in the quality of the playing experience.

These and other features apparent to a skilled person from reading this application and reviewing the drawings and materials appended hereto are within the scope of the present invention. The scope of the invention is to be determined from the claims appended hereto.

Attached are three pages of specifications for billiard equipment, which may be relevant to the present invention. The various features, apparatus and embodiments of the present invention may be fabricated to these specifications.

The Cushions

Cushion: Rubber cushions should be triangular in shape and molded with the conventional K-66 profile with a base of 13/16" and a nose height of 1", with control fabric molded to the top and base area of the cushion. On carom billiard tables, the triangular k-55 profile cushion is to be maintained, with the control fabric on the underside of the cushion to effect a slower rebound action. On snooker tables, the triangular k66 profile or L-shaped snooker cushion is to be used. The balance of the rail section to which the rubber cushion is glued should be of hardwood construction and attached to the slate bed with a minimum of three (3) heavy duty, threaded rail bolts per rail.

For proper play the table should have good quality K66 profile cushions. K-66 refers to the shape of the cushion. It is an industry standard. A lower grade K-66 cushion is used on some less expensive tables as a means of reducing cost.

The cushion should adhere firmly to the rail in a straight line free of any waves. Setting the rail rubber is a tricky operation requiring experienced personnel. Canvas backing helps the cushion adhere to the rail. Loose cushions will affect the accuracy of play. Accuracy will also be compromised by cushion that lacks control fabric. Control fabric is canvas embedded in the top of the cushion. It controls the action of the rubber and insures accurate rebound. Although required by BCA regulations for many years, some manufacturers have begun omitting this crucial component of the rail cushion.

The distance from the playing surface to the nose of the cushion is absolutely critical to the playability of the table. For optimal playability, this distance must be 64% of the ball diameter, or 1.44 inches (standard ball diameter is 2.25 inches). Cushion set lower than 144" will cause the ball to hop or even bounce off the table when struck hard. Cushions set higher will dampen the rebound resulting in a noisy thud and dead ball. Cushions set precisely will be both lively and quiet.

Table Sizes 3½'×7', 4'×8', and 4½'×9' with the Play Area measuring twice as long as it is wide (±⅛") from the cloth covered nose of the cushion rubber to the opposite cushion rubber. 4 ½'×9' tables with a Play Area of 50"×100" are the recognized size for professional tournament play.

Table Bed Height

The table bed playing surface, when measured from the bottom of the table leg, will be 29¼" minimum to 31" maximum.

Pocket Openings & measurements (Cloth covered rails)

Pocket openings are measured from tip to tip of the opposing cushion noses where direction changes into the pocket. This is called the mouth.

Corner Pocket: Mouth Between 4⅞" minimum to 5⅛" maximum

Side Pocket: Mouth Between 5⅜" minimum to 5⅝" maximum

The angle at the corner pocket entrance on each side of the pocket is 142° (±1°). The angle at the side pocket entrance on each side of the pocket is 103° (±2°).

Vertical Pocket Angle: 12° minimum to 15° maximum.

Shelf: The shelf is measured from the center of the imaginary line that goes from one side of the mouth to the other were the nose of the cushion changes direction to the center of the vertical cut of the slate pocket radius.

Corner Pocket: . . . 1⅝" minimum to 1⅞" maximum

Side Pocket: 0" minimum to ⅜" maximum

Drop Point Slate Radius: The pocket radius measured from the vertical cut of the slate to the playing surface.

Drop Point Slate Radius ⅛" radius min. to ¼" radius max.

Playing Bed

The playing surface must be capable, either by its own strength or a combination of its strength and that of the table base frame, of maintaining an overall flatness within ±0.020" lengthwise and ±0.010" across the width. Further, this surface should have an additional deflection not to exceed 0.030" when loaded with a concentrated static force of 200 pounds at its center. All slate joints must be in the same plane within 0.005" after leveling and shimming. The bed must be covered with a billiard fabric, the major portion of which is made of wool, with proper tension to avoid unwanted ball roll-off. It is recommended that professional tournament size tables have a three-piece set of slate with a minimum thickness of 1" and a wooden frame of at least ¾" attached to slate. BCA will sanction tournament play on home and coin operated tables with one-piece slate providing the Play Area requirements are met. All playing surfaces must be solidly secured to base frame with screws or bolts.

Cushion

Cushions should react so that they conform under controlled conditions to the three cushion angles prescribed in the "diamond" (or site) system showing in the diagram on page 191 of *Billiards: The Official Rules and Records Book* to ±1 ball width. The speed of the table cushions should be such that placement of a ball on the head spot, shooting through the foot spot, using center ball english, with a level cue and firm stroke, the ball must travel a minimum of 4 to 4½ lengths of the table without jumping.

Pool BALL Specifications

Molded and finished in a perfect sphere in the following weight and diameter:

Pocket Billiard Balls

Weight: 5½ to 6 oz. *Diameter: 2¼" *Diameter tolerance of (plus or minus) 0.005"

Pool Cue Specifications

Player may bring a maximum of 3 cue sticks to a match

Width of tip: 9 mm minimum/14 mm maximum

Weight: no minimum/25 oz. maximum

Length: 40 inches minimum/no maximum

Ferrule, if of a metal material, may not be more than 1 inch in length

The cue tip on any stick used to perform a legal jump shot must be composed of either a leather or synthetic leather material.

What is claimed is:

1. A cushion suitable for use as a rail on a table selected from the group consisting of a pool table, a snooker table, a billiards table, and a bumper pool table, said cushion comprising an extruded member having a cross-section which is selected from the group consisting of substantially triangular and substantially L-shaped, and tape formed integrally with said cushion on at least one side of the cushion for the purpose of adhering the cushion to a billiard table, said tape and cushion member being formed integrally by co-extrusion of said tape and said cushion member.

2. A cushion as claimed in claim 1, wherein said tape is selected from the group consisting of hot bonded tape and cold bonded tape.

3. A cushion as claimed in claim 1, wherein said member has a Shore hardness of 25–45 on the A scale instantaneous.

4. A cushion as claimed in claim 3, wherein said member rates 60— 90 on the resilience test per ASTM standard D 2632-96.

5. A cushion as claimed in claim 4, wherein said member comprises a polymeric material.

6. A cushion as claimed in claim 4, wherein said cushion does not include a control cloth.

7. A cushion as claimed in 4, wherein said cushion has a substantially triangular cross-section.

8. A cushion as claimed in claim 4, wherein said cushion has a substantially L-shaped cross-section.

9. A table selected from the group consisting of a pool table, a snooker table, a billiards table, and a bumper pool table, comprising a cushion as claimed in claim 1.

10. A table selected from the group consisting of a pool table, a snooker table, a billiards table, and a bumper pool table, comprising a cushion as claimed in claim 4.

11. A table selected from the group consisting of a pool table, a snooker table, a billiards table, and a bumper pool table, comprising a cushion as claimed in claim 5.

12. A method of manufacturing a cushion as claimed in claim 1, comprising the step of co-extruding a polymeric material and tape on at least one side of the cushion for the purpose of adhering the cushion to a billiard table, to form a co-extruded member having a cross-section which is selected from the group consisting of substantially triangular and substantially L-shaped, and wherein said tape and cushion member are formed integrally by said co-extrusion step.

13. A method as claimed in claim 12, wherein said extruded member has a Shore hardness of 25–45 on the A scale instantaneous.

14. A method as claimed in claim 13, wherein said extruded member rates 60–90 on the resilience test per ASTM standard D 2632-96.

15. A cushion as claimed in claim 1, wherein said tape is selected from the group consisting of hot bonded tape and cold bonded tape.

* * * * *